United States Patent [19]

Kuhnle

[11] 4,274,500
[45] Jun. 23, 1981

[54] ELECTRICALLY PRICE-CALCULATING BALANCE

[75] Inventor: Ernst Kuhnle, Balingen, Fed. Rep. of Germany

[73] Assignee: Bizerba-Werke Wilhelm Kraut KG, Balingen, Fed. Rep. of Germany

[21] Appl. No.: 65,843

[22] Filed: Aug. 13, 1979

[30] Foreign Application Priority Data

Aug. 17, 1978 [DE] Fed. Rep. of Germany ....... 2836010

[51] Int. Cl.³ .................... G01G 23/22; G01G 21/00; G01G 21/28
[52] U.S. Cl. .................................. 177/25; 177/126; 177/239; 177/DIG. 3; D10/91
[58] Field of Search ................. 177/126, 129, 25, 238, 177/239, 243, DIG. 3; D10/91

[56] References Cited

U.S. PATENT DOCUMENTS

| | | | |
|---|---|---|---|
| 2,228,872 | 1/1941 | Durfee | 177/245 X |
| 3,743,040 | 7/1973 | Hutchinson et al. | 177/126 |
| 3,838,744 | 10/1974 | Tanji et al. | 177/DIG. 3 |
| 4,036,316 | 7/1977 | Rock | 177/25 X |

*Primary Examiner*—George H. Miller, Jr.
*Attorney, Agent, or Firm*—Laubscher & Laubscher

[57] ABSTRACT

There is disclosed an electrically price-calculating balance, in particular a balance for a shop's counter, comprising an indicator part and a weighing part each constructed as a separate unit. The indicator part has an upper surface which is constructed as a support surface for the weighing part and the weighing part is mountable on the indicator part.

5 Claims, 5 Drawing Figures

ELECTRICALLY PRICE-CALCULATING BALANCE

The invention relates to an electrically price-calculating balance, particularly but not exclusively to such a balance for a shop's counter, having an indicator part and a weighing part each constructed as a separate constructional unit.

BRIEF DESCRIPTION OF THE PRIOR ART

In known balances of this kind, the indicator part is mounted separately from the weighing part. This permits the respective circumstances in a retail shop to be taken into account, in particular the visibility conditions on both sides of a shop's counter, by appropriate disposition from case to case of the two parts. It is desirable in certain cases of use to locate the two parts for reasons of space as closely together as possible and in a space-saving manner. However, this problem has not yet been solved with the desirable perfection for the known balances of this kind.

SUMMARY OF THE INVENTION

It is an object of the invention to provide an electrically price-calculating balance, in particular such a balance for a shop's counter, having separate weighing and indicator parts, which balance permits a compact arrangement of the two parts with a minimum demand on space.

The invention provides an electrically price-calculating balance comprising an indicator part and a weighing part each constructed as a separate unit, the indicator part having an upper face which is constructed as a support surface for the weighing part and the weighing part being mountable on the indicator part.

There is thus provided a balance which may be employed universally, i.e. with separate disposition of the indicator part and the weighing part, and in a space saving compact arrangement, for example, in the manner of a desk balance.

BRIEF DESCRIPTION OF THE FIGURES

The invention will now be more particularly described with reference to the accompanying drawing, wherein.

DETAILED DESCRIPTION

Figure 1:
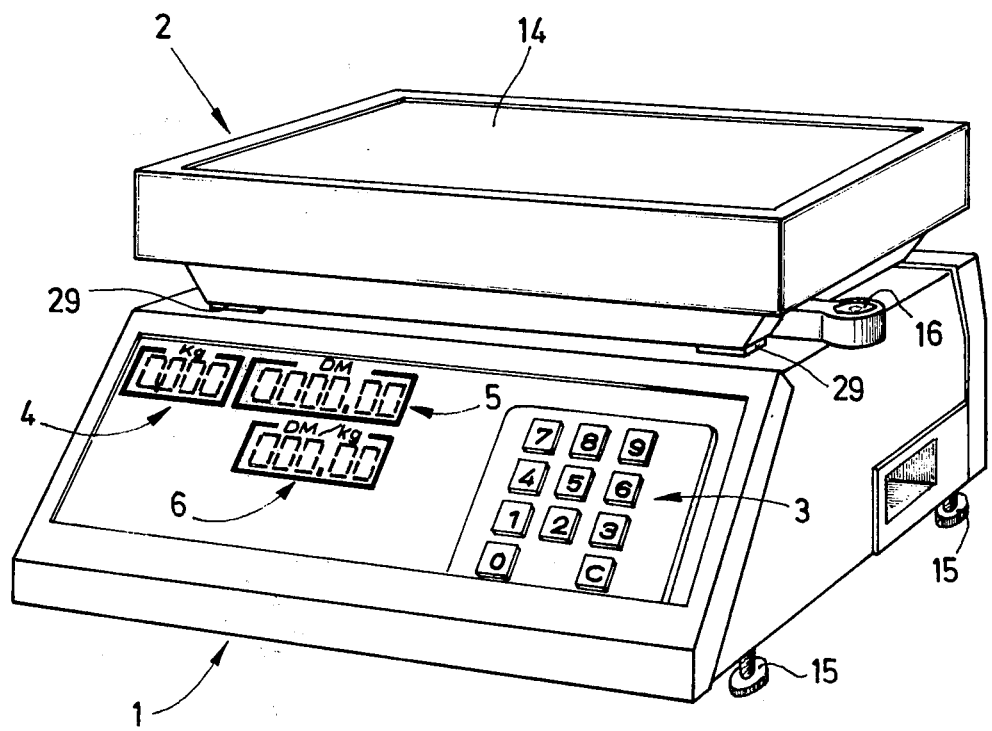
FIG. 1 is a perspective view of one embodiment of an electrically price-calculating balance according to the invention and in a compact arrangement.

The electrically price-calculating balance illustrated in the drawing is constructed as a balance for a shop's counter and comprises an indicator part 1 and a weighing part 2. In a manner known per se, the indicator part comprises a mechanism which includes depressable keys 3, for adjusting the basic price i.e. price/unit weight. The weight price and the basic price, respectively, are displayable in indicator fields 4,5,6 and 7,8,9 on the front and rear faces, respectively, of the indicator part. An electrical calculator device enclosed by the casing of the indicator part 1 determines the selling price of the weighed goods from the weight found by the weighing part, and from the basic price.

In the balance illustrated, the weighing part 2 is connected to the indicator part 1 by electrical cables (not illustrated) and is constructed as an electro-mechanical weighing unit which comprises a flat platelike contour. Such an electro-mechanical weighing unit, for example, comprises at least three force receivers known per se which deliver an electrical signal proportional to weight, which electrical signal is supplied to the indicator part 1.

In an alternative embodiment of the invention, the weighing part 2 may be constructed in a known manner as a purely mechanical balance with load platform and lever mechanism, under certain circumstances even combined with a force receiver.

As shown in FIG. 1, the weighing part 2 is deposited directly upon the indicator part 1, so that a compact arrangement of the balance having a minimum space requirement results therefrom. For this purpose, the upper surface of the indicator part 1 is constructed as a support surface for the weighing part 2.

Figure 2:
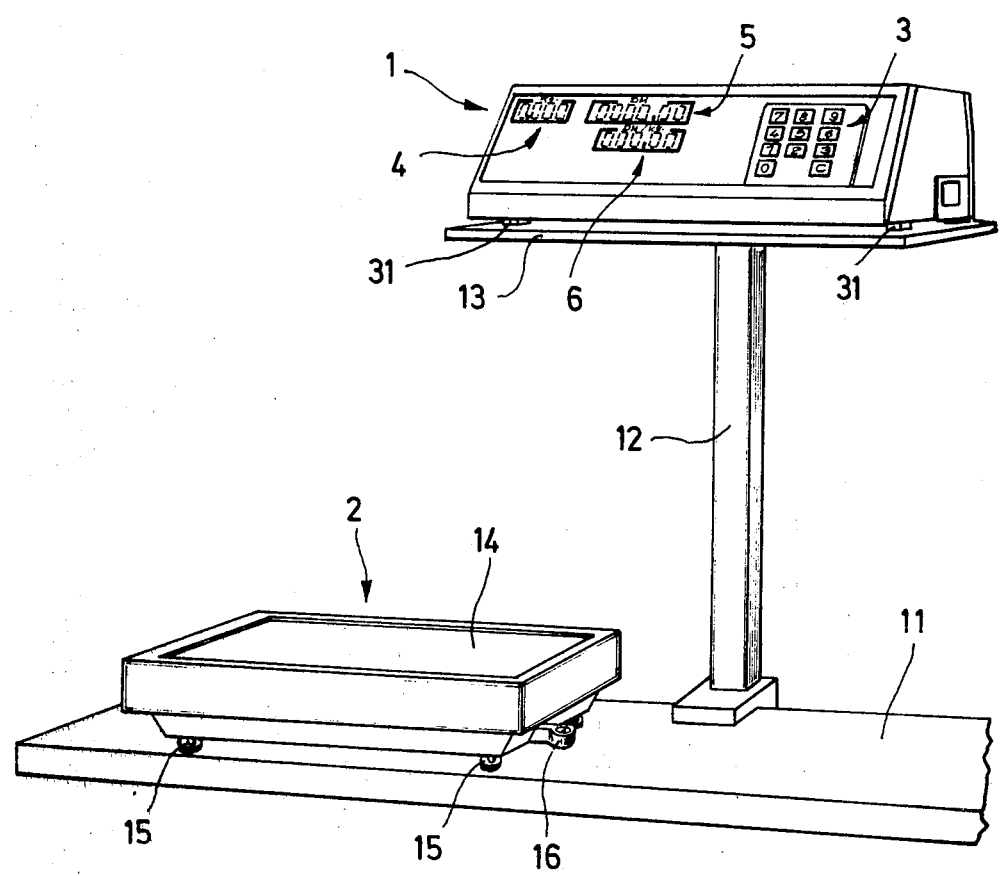
FIG. 2 is a perspective view of the balance of FIG. 1 with the indicator part and weighing part mounted separately.

As shown in FIG. 2, the weighing part 2 is located on a shop's counter 11, and the indicator part 1 is supported on the latter separately and at a higher level by means of a stand 12 and a plate 13.

In the arrangements of FIGS. 1 and 2, the obliquely extending front face of the indicator part 1 with the depressable keys 3 and the indicator fields 4,5,6 faces the sales person, and the rear face with the indicator fields 7,8,9 (FIG. 4) faces a customer. In this way the balance can be operated conveniently by the sales person, whereas the customer has an unimpeded view of the load plate 14 of the weighing part 2 and of the indicator fields 7,8,9.

Figure 3:
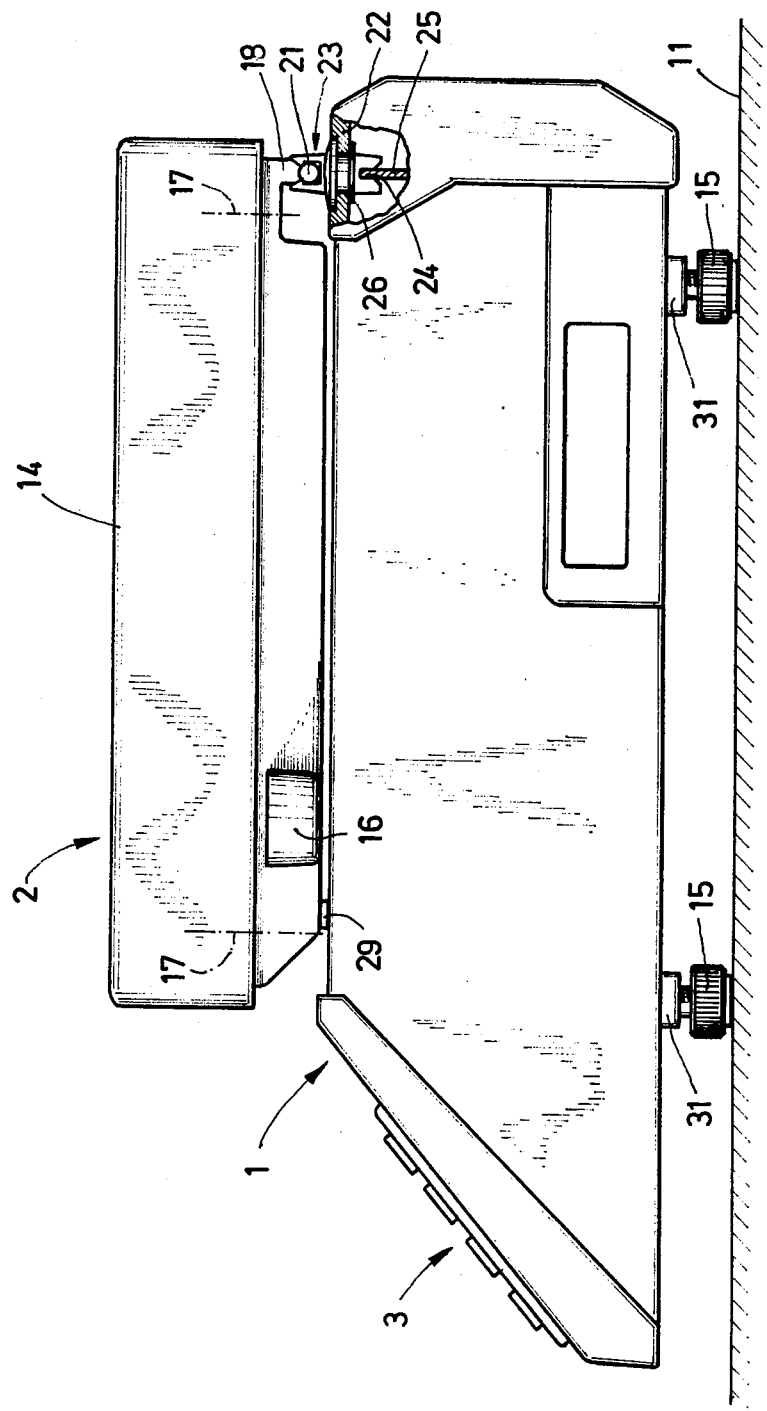
FIG. 3 is a side view of the balance.
Figure 4:
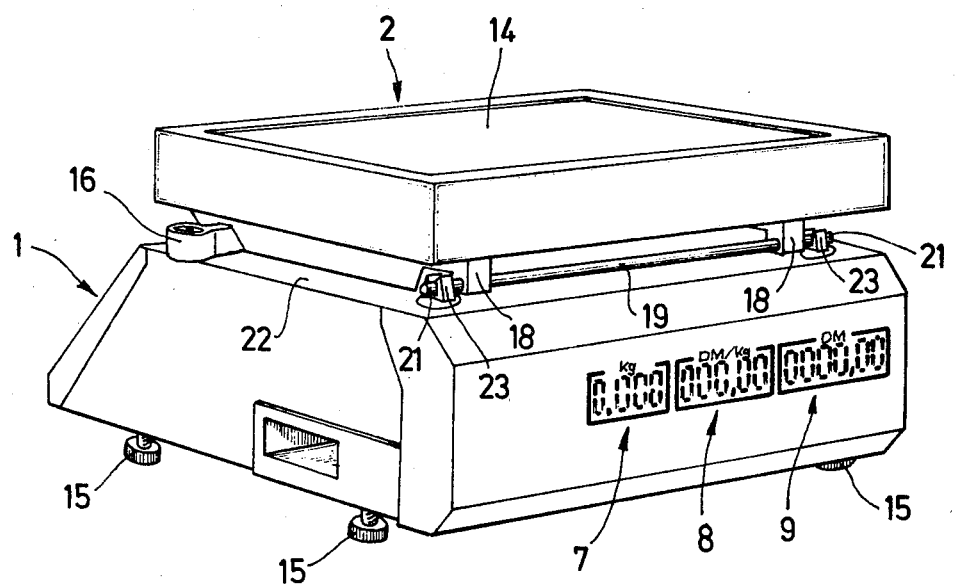
FIG. 4 is a rear view of the balance.

In the arrangement of the indicator part and the weighing part illustrated in FIGS. 1, 3 and 4, four adjustable screws 15 are screwed into the base of the indicator part 1. With the aid of these screws 15 the indicator part 1 and thus the weighing plate 2 may be adjusted to an exactly horizontal position. A spirit level 16 provided on the weighing part 2 permits control of the horizontal adjustment.

When the separate disposition of indicator part and weighing part is to be realized as illustrated in FIG. 2, the foot screws 15 are removed from the indicator part 1 and screwed into appropriate screw-threaded holes in the lower face of the weighing part 2. The location of these screw-threaded holes in the base of the weighing part 2 is illustrated by the dash-dot lines 17 in FIG. 3.

As will be clear from FIGS. 3 and 4, a rod 19 is mounted on the underside of the weighing part 2 adjacent the rear face thereof by means of two lugs 18, and the rod 19 projects at opposite ends beyond the lugs 18 in the form of bearing stubs 21. Two fork-like clips 23 preferably of resilient synthetic resin material are inserted in a plate 22 (see FIG. 3) which defines the upper face of the indicator part 1. The stubs 21 are releasably retainable in the clips 23 so as to provide a pivotal hinge connection between the indicator part 1 and the weighing part 2. The weighing part 2 can be tilted upwards about the axis of the rod 19 so that the upper face of the indicator part 1 can be cleaned easily.

As shown in FIG. 3, each fork-like clip 23 is pushed onto a holder plate 25 of the indicator part 1 by means of a slot 24. A conventional protection device 26, for example in the form of a Seeger protector, ensures a secure connection between the clip 23 and the plate 22 of the indicator part 1.

Figure 5:
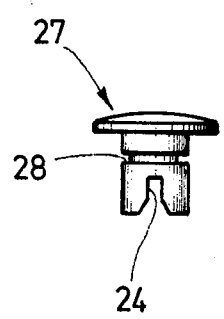
FIG. 5 is a detail view of a closure plug.

When the arrangement of the balance illustrated in FIG. 2 is selected, the clips 23 are unnecessary. In this case they are removed and plugs 27 (one of which is illustrated in FIG. 5) are inserted into the holes in the plate 22.

To remove each clip 23, the rear wall of the indicator part 1 is removed. Subsequently, the protection device 26 is withdrawn from a retaining groove in the clip, whereafter the clip can be pulled upwardly out of the plate 22. A plug 27 is inserted into the resulting hole and secured at its groove 28 by means of the protection device 26.

In the embodiment illustrated and described, the indicator part 1 and the weighing part 2 rests always on four adjustable foot screws 15 which are disposed at the corners of a rectangle. Alternatively, three foot screws may be arranged at the apices of a triangle. Two pads 29 (preferably of rubber of similar material) are attached to the underside of the weighing part 2 adjacent the front face thereof and, for example, at a location opposite the clips 23. These pads 29 and the stubs 21 serve to support the weighing part 2 on the indicator part 1 (FIG. 3). When the indicator part and the weighing part are disposed separately (FIG. 2), the indicator part 1 is supported on small projections 31 which are provided on its underside and in which the screw-threaded holes for receiving the foot screws 15 are provided.

I claim:

1. An electrically price-calculating balance, comprising
    (a) an indicator unit (1) including an upper generally horizontal support surface;
    (b) a weighing unit (2) mounted on said indicator unit support surface; and
    (c) hinge means for pivotally connecting said weighing unit with said indicator unit, said hinge means including
        (1) stub means (21) extending downwardly from the lower surface of said weighing unit adjacent the rear face thereof; and
        (2) clip means (23) having a fork-like configuration and extending upwardly from said indicator unit support surface, said clip means being adapted to receive said stub means.

2. A balance as defined in claim 1, wherein said indicator unit support surface contains a plurality of apertures for receiving said clip means and further comprising plug means (27) for closing said apertures when said weighing unit is removed from said indicator unit.

3. A balance for electrically calculating the price of a quantity of goods, comprising
    (a) an electro-mechanical weighing unit (2) for measuring the weight of the quantity of goods, said weighing unit having a flat plate-like contour;
    (b) an indicator unit (1) including
        (1) an obliquely arranged front surface containing key means (3) for programming the balance and indicator means for indicating the calculated price of the quantity of the goods; and
        (2) an upper generally horizontal surface for supporting said weighing unit; and
    (c) means for levelling said weighing and indicator units, said levelling means comprising a plurality of vertically adjustable threaded foot screw members (15) adapted to be received by a plurality of spaced threaded openings contained in the bottom surfaces of said weighing and indicator units, respectively, whereby when said weighing unit is supported on said indicator unit, the balance has a compact arrangement.

4. A balance as defined in claim 3 wherein said weighing unit includes a spirit level.

5. A balance as defined in claim 3, and further comprising hinge means for pivotally connecting said weighing unit with said indicator unit.

* * * * *